United States Patent
Westberg et al.

(10) Patent No.: US 9,572,099 B2
(45) Date of Patent: Feb. 14, 2017

(54) METHOD FOR HANDLING THE OPERATION MODE OF A BASE STATION

(75) Inventors: Lars Westberg, Enköping (SE); Johan Rune, Lidingö (SE); Erik Friman, Stockholm (SE); Ralf Bergqvist, Bromma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 85 days.

(21) Appl. No.: 14/409,321

(22) PCT Filed: Jul. 4, 2012

(86) PCT No.: PCT/SE2012/050779
§ 371 (c)(1),
(2), (4) Date: Dec. 18, 2014

(87) PCT Pub. No.: WO2014/007700
PCT Pub. Date: Jan. 9, 2014

(65) Prior Publication Data
US 2015/0189586 A1      Jul. 2, 2015

(51) Int. Cl.
*H04W 52/02* (2009.01)
*H04W 28/02* (2009.01)
(Continued)

(52) U.S. Cl.
CPC ..... *H04W 52/0203* (2013.01); *H04W 28/0221* (2013.01); *H04W 52/0206* (2013.01);
(Continued)

(58) Field of Classification Search
CPC .... H04W 88/04; H04W 88/10; H04W 88/085; H04W 88/08; H04W 88/12; H04W 52/0206; H04W 52/0219; H04W 52/0203; H04W 52/0251; H04W 52/04; H04W 84/047; H04W 84/18; H04W 84/045;H04W 84/10; H04W 24/02; H04W 24/04; H04W 16/00; H04W 28/0289; H04W 28/0221; H04W 28/08; H04W 28/0231; H04W 36/22; H04W 60/04; H04W 72/0486; H04W 72/0406; H04W 72/0426; H04W 72/0433; H04W 72/1252

See application file for complete search history.

(56) References Cited

U.S. PATENT DOCUMENTS

2008/0214221 A1   9/2008   Kiyomoto et al.
2011/0312359 A1   12/2011  Kolding et al.
(Continued)

FOREIGN PATENT DOCUMENTS

| EP | 1638356 A1 | 3/2006 |
|---|---|---|
| EP | 1924109 A1 | 5/2008 |
| WO | 2011158862 A1 | 12/2011 |

OTHER PUBLICATIONS

Office Action in EP application No. 12880386.3 mailed Feb. 26, 2016.
(Continued)

*Primary Examiner* — Kwang B Yao
*Assistant Examiner* — Ricardo Castaneyra
(74) *Attorney, Agent, or Firm* — Patent Portfolio Builders, PLLC

(57) ABSTRACT

The embodiments herein relates to a method in a first network node for handling operation mode of a base station in a communications network. The communications network comprises a transport network. The first network node activates a Remote Unit-Main Unit, RU-MU, operation mode in the base station when data traffic load in the transport network is below a first threshold. The first network node activates a regular operation mode in the base station when the data traffic load in the transport network is above a second threshold.

28 Claims, 7 Drawing Sheets

(51) Int. Cl.
 H04W 28/08 (2009.01)
 H04W 84/10 (2009.01)
 H04W 88/08 (2009.01)
 H04W 88/10 (2009.01)

(52) U.S. Cl.
 CPC ........ H04W 28/02 (2013.01); H04W 28/0231 (2013.01); H04W 28/0284 (2013.01); H04W 28/0289 (2013.01); H04W 28/08 (2013.01); H04W 84/10 (2013.01); H04W 88/085 (2013.01); H04W 88/10 (2013.01)

(56) References Cited

U.S. PATENT DOCUMENTS

| | | | |
|---|---|---|---|
| 2012/0165063 A1* | 6/2012 | Scalia | H04W 52/343 455/522 |
| 2013/0095811 A1 | 4/2013 | Okino | |
| 2013/0250908 A1* | 9/2013 | Bach | H04W 52/0206 370/331 |
| 2014/0105056 A1* | 4/2014 | Li | H04W 24/02 370/252 |

OTHER PUBLICATIONS

International Search Report and Written Opinion for PCT/SE2012/050779, mailed Jul. 12, 2013, 9 pages.

\* cited by examiner

Fig 3. Cascaded base stations

Fig. 4 Base stations in a ring structure.

Fig. 5 Base stations in a tree topology

METHOD FOR HANDLING THE OPERATION MODE OF A BASE STATION

This application is a 35 U.S.C. §371 national phase filing of International Application No. PCT/SE2012/050779, filed Jul. 4, 2012, the disclosure of which is incorporated herein by reference in its entirety.

TECHNICAL FIELD

Embodiments herein relate generally to a first network node and a method in the first network node. More particularly the embodiments herein relate to handling operation mode of a base station in a communications network.

BACKGROUND

In a typical communications network, also referred to as a wireless communication network, communication system or wireless communication system, a User Equipment (UE), communicate via a Radio Access Network (RAN) to one or more Core Networks (CNs).

A user equipment is a device by which a subscriber may access services offered by an operator network and services outside operator's network to which the operators radio access network and core network provide access, e.g. access to the Internet. The user equipment may be any device, mobile or stationary, enabled to communicate over a radio channel in the communications network, for instance but not limited to e.g. mobile phone, smart phone, sensors, meters, vehicles, household appliances, medical appliances, media players, cameras, or any type of consumer electronic, for instance but not limited to television, radio, lighting arrangements, tablet computer, laptop or Personal Computer (PC). The user equipment may be portable, pocket storable, hand held, computer comprised, or vehicle mounted user equipments, enabled to communicate voice and/or data, via the radio access network, with another entity, such as another user equipment or a server.

User equipments are enabled to communicate wirelessly with the network. The communication may be performed e.g. between two user equipments, between a user equipment and a regular telephone and/or between the user equipment and a server via the radio access network and possibly one or more core network nodes and possibly the Internet.

The radio access network covers a geographical area which is divided into cell areas, with each cell area, or group of cell areas, being served by a base station, e.g. a Radio Base Station (RBS), which in some radio access networks is also called evolved NodeB (eNB), NodeB, B node or base station. A cell is a geographical area where radio coverage is provided by the base station at a base station site. Thus, the communications network may also be referred to as a cellular network. The base stations communicate over the air interface with the user equipments within range of the base stations. The base station will be referred to as BS in some of the drawings.

A technology that is gaining ground in current communications networks is the use of Remote Radio Units (RRU), also known Remote Radio Heads (RRH). With this concept a base station is split into one part for the lower layer radio related mechanisms and another part for the higher layers, e.g. baseband processing. The former are called RRUs, RRHs or simply Remote Units (RUs), and are geographically distributed to the antenna sites, or close to the antenna sites, while the latter is deployed as a pooled resource cluster in a more central site, e.g. so-called baseband hotels. The centrally located part is called Main Unit (MU). Hence, this concept may also be referred to as RU-MU operation mode. RU-MU operation mode involves reduced hardware cost and reduced energy consumption, as a result of hardware pooling gains. A disadvantage of the concept is that RU-MU operation mode requires more transport network transmission capacity than regular operation mode and thus relies on the presence of (preferably cheap) high data rate transport network connections between the central site and the remote sites. Regular operation mode refers to a regular base station where the functionality of both the MU and the RU is integrated in the base station (in which case the terms "MU" and "RU" are not used).

A network deployment strategy which sometimes fits very well with RU-MU operation mode is the so-called heterogeneous networks deployment strategy, which is more or less generally assumed to be dominant in future communications networks. In a heterogeneous network large and small cells, high power and low power base stations/access points are mixed with each other in a largely overlapping fashion. Different cells may also employ different Radio Access Technologies (RATs), such as LTE FDD and LTE TDD, other RATs of the Third Generation Partnership Project (3GPP) family. Other RATs of the 3GPP family may be Universal Mobile Telecommunications System (UMTS)/High Speed Packet Access (HSPA) and/or Global System for Mobile communication (GSM)/General Packet Radio Service (GPRS)/Enhanced Data rates for GSM Evolution (EDGE), and non-3GPP RATs, e.g. the IEEE 802.11x family (where "x" may be e.g. "a", "b", "g" or "n") RATs or 3GPP2 RATs, e.g. Code Division Multiple Access 2000 (CDMA2000). LTE is short for Long Term Evolution, FDD is short for Frequency Division Duplex and TDD is short for Time Division Duplex. IEEE is short for Institute of Electrical and Electronics Engineers.

In a heterogeneous network the same location is often covered (i.e. within the radio transmission and reception coverage area) by more than one cell and base station or access point. Pico cells, also referred to as the pico cell layer (or pico layer) are often deployed to provide greater capacity in hotspot areas with dense user population and intense wireless communication, while macro cells, also referred to as the macro cell layer (or macro layer) provide the overall wide area coverage. Pico and femto cells, as well as RRUs may also be deployed to improve coverage in locations which are poorly covered by the macro cell layer, e.g. indoors.

Another topic that currently receives a lot of attention in the communications network industry is the importance of energy efficiency, both for the purpose of reducing Operational EXpenses (OPEX) and in order to save the environment by reducing the $CO_2$ footprint of communications networks. Another motive is to create goodwill for the operators and for the industry as a whole.

Combining heterogeneous networks and energy efficiency provides opportunities to leverage the greater number of base stations and the layered cell architecture of heterogeneous networks which often have overlapping coverage areas. To this end, schemes have been proposed where some cells of one layer, e.g. pico cells, are powered down (put in sleep mode) when the data traffic load and resource demands are low enough for the macro layer to handle. This principle may be used even in a non-overlapping scenario, where instead the coverage areas of neighboring cells are extended, either by tilting up the antennas or utilizing reconfigurable antenna system techniques or adaptive antenna mechanisms, so that they cover the area of a cell that is currently in sleep mode.

Sleep mode may be utilized on various time scales and various levels in terms of affected hardware. The sleep mode may affect the entire base station, the part of the base station responsible for a certain cell, the transmission equipment, including the Power Amplifier (PA), or single circuit boards or components being part of pooled equipment. The time scale may be hours, e.g. shutting down an entire base station during nighttime, all the way down to milliseconds, e.g. putting single components, or even the PA, into sleep mode on an LTE subframe basis. In order to carry information of different types between the base station and the user equipment, the LTE system has a defined LTE frame and subframe structure for the Evolved Universal Terrestrial Radio Access (E-UTRA), i.e. the air interface for LTE. A frame may have a certain length, e.g. 10 ms, and the frame is divided into a number of individual slots. A LTE subframe comprises two time slots.

Such energy saving sleep mode strategies may be utilized even in deployments where the coverage is not taken over by higher layer or neighboring cells. Potential scenarios may be low load periods (even empty cells which are not uncommon) or in combination with controlled Discontinuous Transmission (DTX) strategies where the user equipments in the cell know when to expect and when not to expect transmissions, such as reference signals and system information, from the base station. On-demand wakeup of sleeping cells to be ready to receive user equipments handed over from neighbor cells is another mechanism that may be used in conjunction with energy saving based on sleep mode.

A problem with the RU-MU operation mode concept is that the cheap high-rate transmission capacity in the transport network that the concept relies on is often not available. Instead, the transport network capacity is often more or less fully, or at least to a large degree, utilized during periods of high data traffic load. This limits the potential deployment scenarios for RU-MU operation mode and hence the full potential of hardware and energy saving cannot be leveraged.

SUMMARY

An object of embodiments herein is therefore to obviate at least one of the above problems and disadvantages and to provide improved energy saving in communications networks.

According to a first aspect, the object is achieved by a method in a first network node for handling operation mode of a base station in a communications network. The communications network comprises a transport network. The first network node activates a RU-MU operation mode in the base station when data traffic load in the transport network is below a first threshold. The first network node activates a regular operation mode in the base station when the data traffic load in the transport network is above a second threshold.

According to a second aspect, the object is achieved by a method in a first network node for handling operation mode of a base station in a communications network. The communications network comprises a transport network. The first network node comprises a processor configured to activate the RU-MU operation mode in the base station when data traffic load in the transport network is below a first threshold. The processor is further configured to activate the regular operation mode in the base station when the data traffic load in the transport network is above a second threshold.

Dynamic, load dependent switching is performed between RU-MU mode and regular operation mode of the base station. Thus, when the traffic carried by the transport network is low, so that enough transmission capacity for RU-MU operation mode is available, the operation mode may be switched from regular operation mode to RU-MU operation mode for one or more base station(s). This enables RU-MU related energy savings even in deployments where this would normally not be possible because of lack of transport network transmission resources.

Embodiments herein afford many advantages, of which a non-exhaustive list of examples follows:

An advantage of the embodiments herein is that they allow the energy saving benefits of RU-MU operation mode of base stations to be leveraged in deployment scenarios where the lack of excessive transmission resources in the transport network would otherwise prohibit RU-MU operation mode.

Another advantage of the embodiments herein is that they may be deployed in any cellular system, such as Evolved Packet System (EPS), UMTS, GSM/GPRS or CDMA2000.

A further advantage of the embodiments herein is that they reduce OPEX and saves the environment by reducing the $CO_2$.

The embodiments herein provide the advantage of leveraging full potential of hardware and energy savings.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

Figure 1:
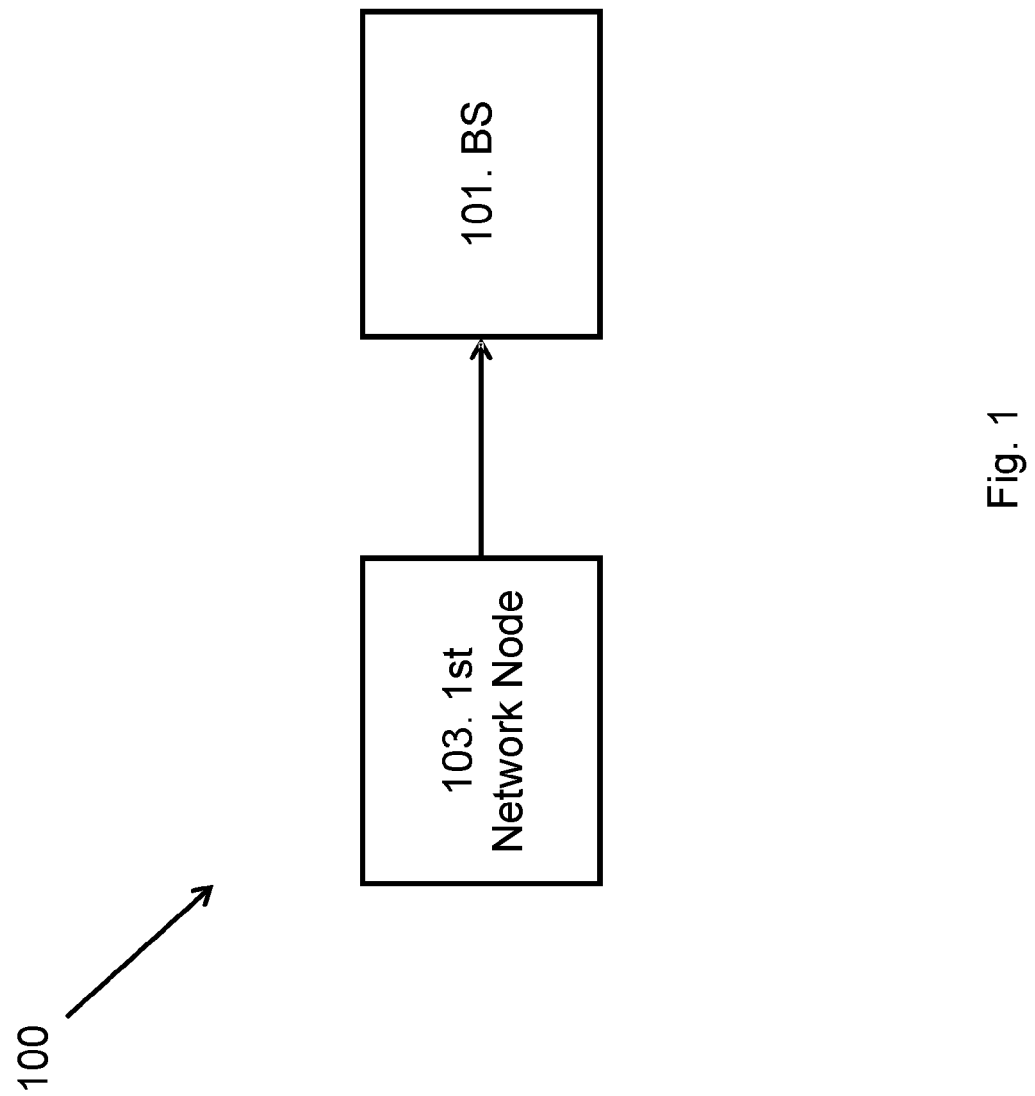
FIG. 1 is a schematic block diagram illustrating embodiments of a communications network.

FIG. 1 depicts a communications network 100 in which embodiments herein may be implemented for load dependent RU-MU operation mode of a base station. The communications network 100 may in some embodiments apply to one or more radio access technologies such as for example LTE, LTE Advanced, Wideband Code Division Multiple Access (WCDMA), GSM, CDMA2000, CDMA 1×EV-DO or any other 3GPP or 3GPP2 radio access technology, or other radio access technologies such as for example Wireless Local Area Network (WLAN). EV-DO stands for Evolution-Data Optimized. The communications network 100 has a protocol structure and it is layered into a Radio Network Layer (RNL) and a Transport Network Layer (TNL). Logical nodes and interfaces between them, is defined as part of the radio network layer. The transport network layer provides services for user plane transport and signaling transport. In the following, the transport network layer will be referred to as the transport network.

The communications network 100 comprises a base station 101 serving a cell. The base station 101 may be a base station such as a NodeB, an eNB, or any other network unit capable to communicate over a radio carrier with a user equipment (not shown) being present in the cell. Even though FIG. 1 illustrates only one base station 101 for the sake of simplicity, the skilled person will understand that the communications network 100 may comprise a plurality of base stations 101.

The user equipment may be any device, mobile or stationary, enabled to communicate over the radio channel in the communications network, for instance but not limited to e.g. mobile phone, smart phone, sensors, meters, vehicles, household appliances, medical appliances, media players, cameras, or any type of consumer electronic, for instance but not limited to television, radio, lighting arrangements, tablet computer, laptop or PC.

The communications network 100 comprises a first network node 103 configured to communicate with the base station 101. In some embodiments, the first network node 103 is comprised in the base station 101. In some embodiments, the first network node 103 is an O&M equipment, such as an Operations Support System (OSS), e.g. a Network Operation Center (NOC), the MU site, or another network node, e.g. a control node in the radio network node, such as a Radio Network Controller (RNC) in UMTS.

It should be noted that the communication link between the base station 101 and the first network node 103 may be of any suitable kind including either a wired or wireless link and, as mentioned above, the first network node 103 may also be comprised in the base station 101. The link may use any suitable protocol depending on type and level or layer (e.g. as indicated by the Open Systems Interconnection (OSI) model) as understood by the person skilled in the art.

The method for handling operation mode of a base station 101 in a communications network 100 according to some embodiments will now be described with reference to the combined signalling diagram and flowchart depicted in FIG. 2. The method comprises the following steps, which steps may as well be carried out in another suitable order than described below.

Step 201

Initially the base station 101 is operated in regular operation mode. The first network node 103 detects that the data traffic load in the transport network is below a first threshold. The data traffic load may be represented by the bit rate or by the average bit rate, or utilization in the transport network (or on a bottleneck resource (e.g. a transmission link or other transmission equipment such as a router, a switch or a SDH cross-connect that limits the capacity of the transport network) of the transport network) or as a relative measure indicating the fraction of the full capacity of the transport network (or a bottleneck resource of the transport network) that is utilized. Many types of parameters or combinations of parameters may be used.

The reason for the data traffic to be below the first threshold may be for example normal traffic fluctuations in the cell of the base station, e.g. due to daily variation (e.g. differences between office hours, evening and night time as well as weekends), that certain cells or base stations in the communications network 100 are closed down in order to save energy or for maintenance purposes or simply due to faults (e.g. power failure, hardware or software failure).

In some embodiments, the first network node 103 may determine, in addition to considering the data traffic load, whether the base station 101 has a transport network transmission capacity for the RU-MU operation mode which is above a third threshold. In other words, the base station 101 has a sufficient amount of available transport network transmission capacity for the RU-MU operation mode.

The first network node 103 may receive information about the transport network load and the transport network transmission capacity for the RU-MU operation mode from the base station 101 or from another suitable network node upon request or it may receive the information periodically.

Step 202

The first network node 103 determines that the RU-MU operation mode should be activated in the base station 101 when the data traffic load is below the first threshold. In some embodiments, the first network node 103 also takes the transmission network capacity for the RU-MU operation mode into account with the condition for activation of the RU-MU operation being that the transmission network capacity for the RU-MU operation mode is above the third threshold. In other words, there should be a change from regular operation mode as a single, integrated base station to RU-MU operation mode. As mentioned earlier, in regular operation mode both the MU and the RU functionality is comprised in the base station 101 (and then it is not referred to as MU and RU), whereas in RU-MU operation the functionality in the base station 101 is split in two parts where one part is located in the MU and the other part in the RU.

Step 203

The first network node 103 transmits instructions to the base station 101 about the decision in step 202, i.e. the decision to operate in RU-MU operation mode. Even though FIG. 2 illustrates that the first network node 103 only transmits instructions to one base station 101, the skilled person will understand that the first network node 103 may transmit instructions to a plurality of base stations 101.

Step 204

Based on the received instructions, the base station 101 activates and operates in RU-MU operation mode.

Step 205

The first network node 103 detects that the data traffic load in the transport network is above a second threshold. The first threshold may be equal to the second threshold, or the first threshold may be different from the second threshold, i.e. there is a gap between the first threshold and the second threshold, such that a hysteresis is provided between the thresholds in order to avoid too frequent switching between the operation modes.

In some embodiments, the first network node 103, in addition to considering the data traffic load, also determines whether the base station 101 has a transport network transmission capacity for the RU-MU operation mode which is below a fourth threshold. In other words, the base station 101 has only a sufficient amount of available transport network transmission capacity for the regular operation mode.

The first network node 103 may receive information about the data traffic load and, when applicable, the transport network transmission capacity for the RU-MU operation mode from the base station 101 or from another suitable network node upon request or it may receive the information periodically.

The third threshold may be different from the fourth threshold, i.e. there is a gap between the third threshold and the fourth threshold, such that a hysteresis is provided between the thresholds in order to avoid too frequent switching between the operations modes).

Step 206

The first network node 103 determines that the regular operation mode should be activated in the base station 101 when the data traffic load is above the second threshold. In some embodiments, the first network node 103 also takes the transport network transmission capacity for the RU-MU operation mode in the base station 101 into account with the condition for activating the regular operation mode being that the transport network transmission capacity for the RU-MU operation mode in the base station 101 is below the fourth threshold.

Step 207

The first network node 103 transmits instructions to the base station 101 about the decision in step 206, i.e. the decision to operate in regular operation mode. Even though FIG. 2 illustrates that the first network node 103 only transmits instructions to one base station 101, the skilled person will understand that the first network node 103 may transmit instructions to a plurality of base stations 101.

Step 208

Based on the received instructions, the base station 101 activates and operates in regular operation mode.

The embodiments herein describe transmission capacity related obstacles to RU-MU operation mode in scenarios where the backhaul transport of a set of base stations merges in at least one point—in particular scenarios where the base stations share one or more transmission link(s)—and the backhaul transmission capacity is a limiting resource. Some applicable scenarios are illustrated in FIG. 3, FIG. 4 and FIG. 5.

Figure 3:
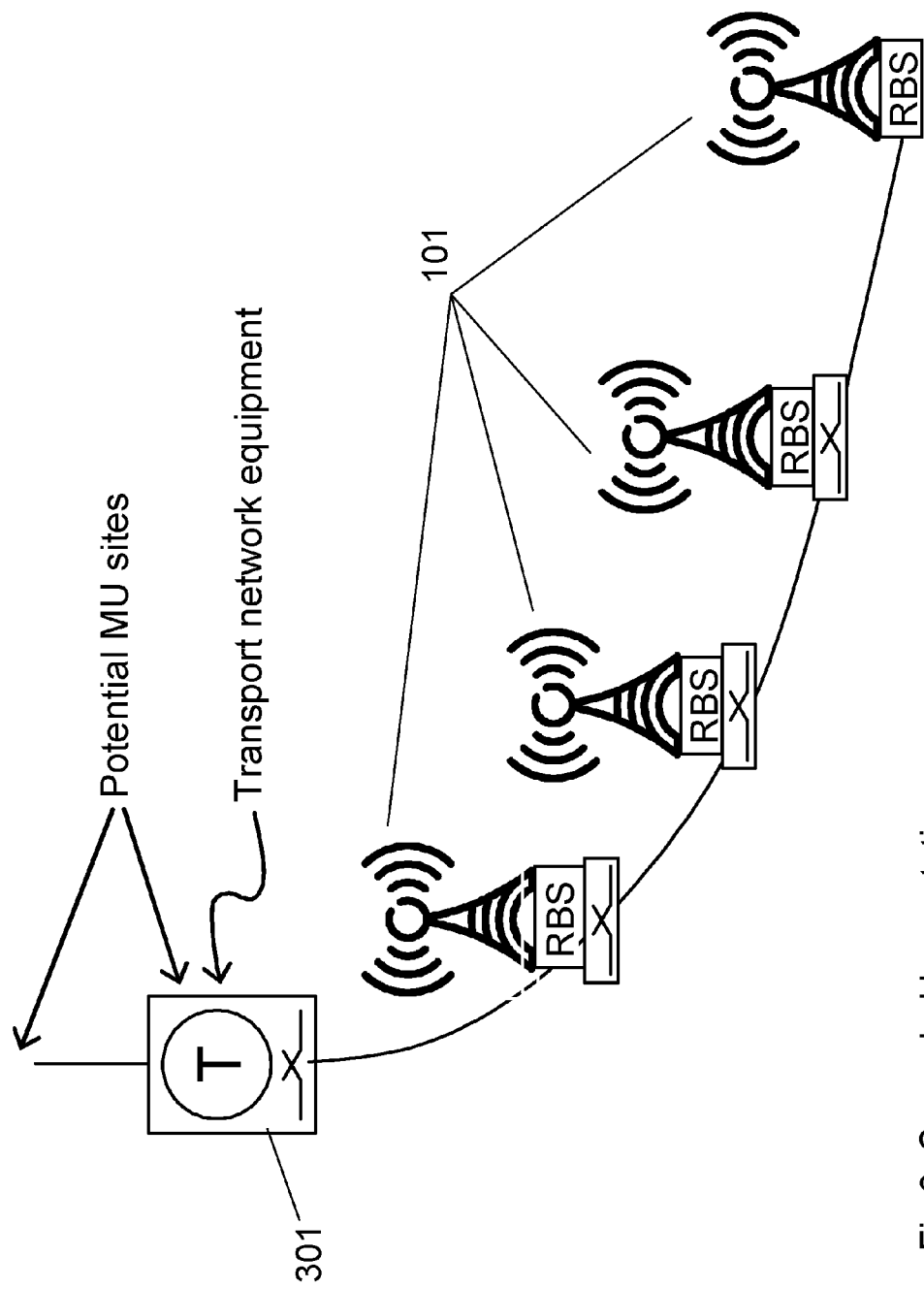
FIG. 3 is a schematic drawing illustrating embodiments of a communications network comprising cascaded base stations.

FIG. 3 is a schematic drawing illustrating the communications network 100 comprising four cascaded base stations 101. In some embodiments, some of the base stations also represent transmission equipment, either embedded or collocated on the base station sites, for backhaul and for forwarding between other nodes. In the beginning of the cascade, there is a transport network equipment 301, e.g. a router or a switch or SDH/PDH equipment, such as an SDH cross-connect. The transport network equipment 301 may be located at a MU site. The skilled person will understand that the drawing is equally applicable to a communications network 100 comprising any other number of cascaded base stations 101 instead of 4. In FIG. 3, the first network node 103 may be the transport network equipment 301 or it may be co-located with one of the base stations 101 or it may be located elsewhere in the network 100.

Figure 4:
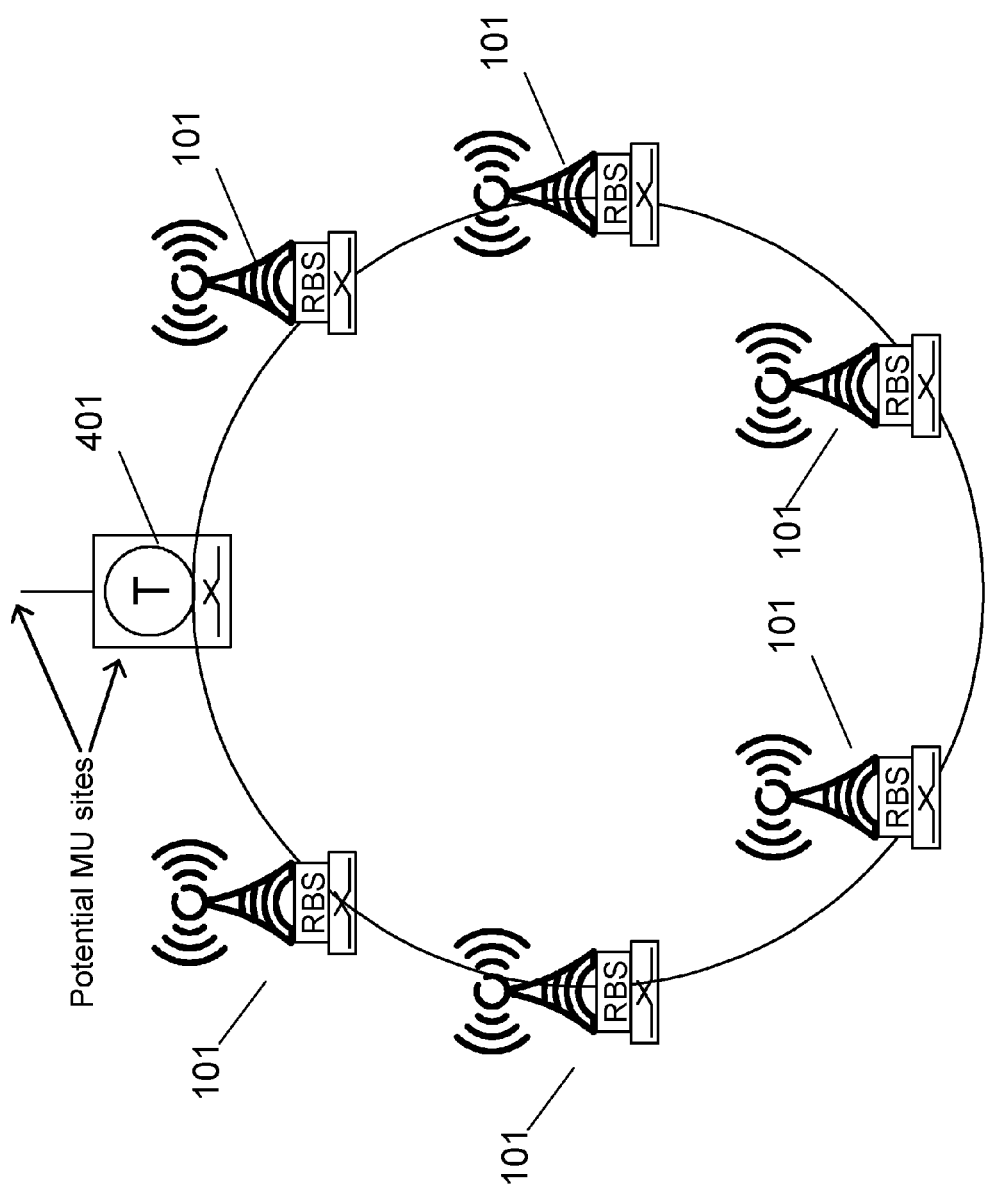
FIG. 4 is a schematic drawing illustrating embodiments of a communications network comprising base stations in a ring structure.

FIG. 4 is a schematic drawing illustrating the communications network 100 comprising 6 base stations 101 in a ring structure. Each base station 101 also represents transmission equipment, either embedded or collocated on the base station site, for backhaul and for forwarding between other nodes. At one point in the ring, there is a transport network equipment 401, e.g. a router or a switch or SDH/PDH equipment, such as a SDH cross-connect. The transport network equipment 401 may be located at any suitable point in the ring. The skilled person will understand that the drawing is equally applicable to a communications network 100 comprising any other number of base stations 101 in the ring structure instead of 4. In FIG. 4, the first network node 103 may be the transport network equipment 401 or it may be co-located with one of the base stations 101 or it may be located elsewhere in the network 100.

Figure 5:
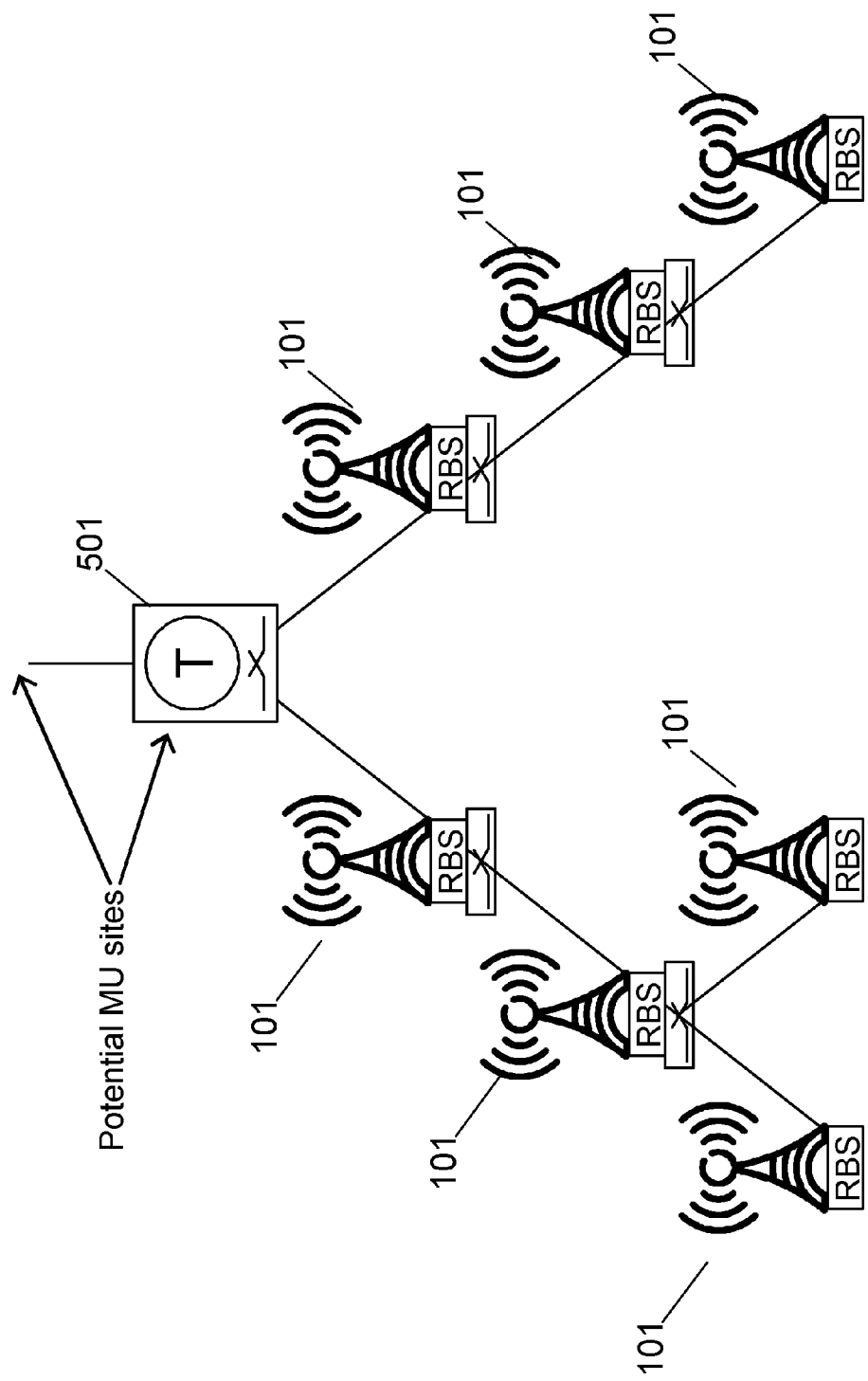
FIG. 5 is a schematic drawing illustrating embodiments of a communications network comprising base stations in a tree topology.

FIG. 5 is a schematic drawing illustrating the communications network 100 comprising 7 base stations 101 in a tree topology. The left branch of the tree is exemplified with 4 base stations 101 and the right branch of the tree is exemplified with 3 base stations 101. Each or some of the base station 101 also represents transmission equipment, either embedded or collocated on the base station site, for backhaul and for forwarding between other nodes. At the top of the tree, there is a transport network equipment 501, e.g. a router or a switch or SDH/PDH equipment, such as a SDH cross-connect. The transport network equipment 501 may be located at any suitable point in the tree, but typically at the top (or root depending on preference of terminology). The skilled person will understand that the drawing is equally applicable to a communications network 100 comprising any other number of base stations 101 in the tree structure instead of 7. In FIG. 5, the first network node 103 may be the transport network equipment 501 or it may be co-located with one of the base stations 101 or it may be located elsewhere in the network.

The decision to switch base station operation mode from regular operation mode to RU-MU operation mode or vice versa is based on the load in the transport network. Assuming that the default operation mode is the regular operation mode in one of the deployment scenarios illustrated in the FIG. 3, 4 or 5. When the backhaul transport network load decreases and the available transmission capacity consequently increases, the base stations 101 may one after the other be switched from regular operation mode to RU-MU operation mode. The decreasing load may be caused by normal traffic fluctuations in the cells of the base stations 101, e.g. due to daily variations (e.g. differences between office hours, evening and nighttime as well as weekends). Other causes may include that certain cells or base stations 101 are closed down in order to save energy or for maintenance purposes or simply due to faults (e.g. power failure, hardware or software failure).

In a similar way, increasing backhaul load triggers switching of the operation mode back from RU-MU operation mode to the regular operation mode for one or more base station(s) 101 to the extent needed to avoid transport network overload.

As may be understood from the description above, one example scenario where the solution may be applied is when some base stations in a cascaded topology are put in sleep mode, resulting in excess capacity in the transport network. When sufficient transmission capacity has been made available the remaining active base stations may (one by one as transmission capacity is made available) be switched to RU-MU operation mode, for example controlled by a central MU, e.g. located at the beginning of the cascade branch.

The dynamic switching between base station operation modes is controlled by the first network node 103. As mentioned above, the first network node 103 may be an O&M equipment, such as an OSS or a NOC. The control of the operation mode may be either manually or (preferably) automatically, e.g. script based. Alternatively, the first network node 103 may be located at the MU site. In that case, the switching may be controlled automatically from the MU site, based on backhaul load measurements performed by the MU itself (or associated collocated equipment) and/or measurement data retrieved from the base stations 101 and/or transport network nodes. Another alternative is that the dynamic switching is controlled by the first network node 103 being another network node, e.g. a control node in the radio network node, such as an RNC in UMTS, based on backhaul load measurements by the RNC itself (or associated collocated equipment) and/or measurement data retrieved from the MU, the base stations 101 and/or transport network nodes.

The thresholds for dynamically switching back and forth between regular operation and RU-MU operation of the base station 101 based on the available capacity in the transport network will now be described in more detail. The thresholds may be designed in several conceivable ways. The following description considers one base station 101 at a time and the thresholds are designed with that in mind. There are at least two thresholds: one for switching from regular operation to RU-MU operation of the base station 101, i.e. the first threshold, and one for switching from RU-MU operation to regular operation, i.e. the second threshold. The two thresholds may be defined in relation to the same quantity (i.e. the same "measurement object/target"). The thresholds may be predefined in the first network node 103, they may be dynamically calculated by the first network node 103, they may be calculated by the first base station 101 or any other suitable network node and transmitted to the first network node 103.

As mentioned above, the thresholds may be related to the (data traffic) load in the transport network. The traffic load may be measured on different layers in the protocol stack. A potentially complicating circumstance is that the protocol layers and the formats and volumes of the transmitted traffic are different in regular operation and RU-MU operation. This may however be circumvented by targeting the load on the physical layer, which is anyway probably the most accurate and suitable measure. In another embodiment, the load in relation to the full capacity may be used, since relative measures may be more suitable than absolute measures for general threshold definitions. Hence, the relative utilization may be a suitable measurement target to relate the thresholds to. The next question is: the relative utilization of what? The answer is that it may be the bottleneck of the part of the transport network that is relevant for the base station 101 for which a switch of operation mode is considered. This may be described as the relative utilization of the transport network or of a bottleneck resource of the transport network, wherein the bottleneck is a resource which limits the available transmission capacity to and/or from the concerned base station and which may be a transmission link or other transport network equipment, such as router, switch or SDH cross-connect equipment". Another way of describing this may be the relative utilization of the transport network or of a bottleneck resource (such as a capacity limiting link or switching equipment) of the transport network. In the following, the entity (be it the transport network or the limiting resource of the relevant part of it) whose utilization or traffic load we are measuring will be referred to as "T".

To calculate the relative utilization the absolute utilization may be measured, in terms of the traffic load, and dividing it by the total capacity of T. In some embodiments, the thresholds may be defined in terms of traffic load, or absolute utilization, and the definition may be made inherently relative by including a relative multiplication factor (e.g. to multiply the total capacity by) in the threshold definition. This is the choice assumed in this document.

Now, the notation used for further description of the thresholds will be explained:

B The base station 101 for which a switch of operation mode is considered.
S The set of other base stations sharing the bottleneck resource of the transport network (i.e. T) with B.
$L_B$ The load on T pertaining to B.
$L_S$ The load on T pertaining to S.
$L_U$ The load on T pertaining to S and B together (i.e. $L_U=L_S+L_B$), i.e. the total load on T (i.e. the utilized capacity of T).
$C_T$ The full capacity of T, measured in the same units as the above defined loads, i.e. $L_B$, $L_S$ and $L_U$. As representing the full capacity of the bottleneck resource, $C_T$ may be dynamically (in a self-learning fashion) estimated.
K A scaling factor representing the increase of the load pertaining to a base station 101 when it is switched from regular operation mode to RU-MU operation mode (e.g. $L_{B-RU-MU-op}=K \times L_{B-regular-op}$).
$T_1$ The threshold for switching from regular operation to RU-MU operation. Hence, when B is operated in regular operation mode, the load on T is monitored with respect to $T_1$.
$T_2$ The threshold for switching from RU-MU operation to regular operation. Hence, when B is operated in RU-MU operation mode, the load on T is monitored with respect to $T_2$.
$t_1$ A multiplication factor used in the definition of $T_1$.
$t_2$ A multiplication factor used in the definition of $T_2$.

The protocol layers and the formats and volumes of the data transmitted over the transport network are different in regular operation and RU-MU operation. The result is that RU-MU operation may cause greater load on the transport network than regular operation. One may estimate that switching from regular operation to RU-MU operation scales up the traffic load by a factor K (e.g. $L_{B-RU-MU-op}=K \times L_{B-regular-op}$).

The purpose of $T_1$ is that after switching from regular operation to RU-MU operation the traffic load of T, i.e. $L_U$, should still have an appropriate margin to the full capacity of T, i.e. $C_T$.

The purpose of $T_2$ is that it should trigger a switch from RU-MU operation to regular operation before T is overloaded, i.e. it should trigger the switch when there is still an appropriate margin between the traffic load of T, i.e. $L_U$, and the full capacity of T, i.e. $C_T$. Furthermore, the margins used in case of $T_1$ and $T_2$ may not be the same, because that would result in an algorithm that is prone to "ping-pong" switches between the operation modes, i.e. frequent, or very frequent, switches back and forth between regular operation and RU-MU operation, which may be undesirable. Instead the margins may differ so that an appropriate hysteresis is formed.

Now to the definitions of the thresholds and how they are used:

$T_1$:

A switch of the mode of operation of B from regular operation to RU-MU operation is triggered when the following condition is met:

$$L_U < t_1 \times C_T - (K-1) \times L_B$$

As previously mentioned $L_U=L_S+L_B$. However, when considering a switch from regular operation to RU-MU operation the increased load must be considered that such a switch would cause. Since $L_B$ is measured during the current regular operation, $L_B$ must be scaled up by multiplying it by K, when estimating the load on T after a potential switch to RU-MU operation for B, i.e. $L_{U-estimated}=L_S K \times L_B$. Given that $L_U=L_S+L_B$ this equation may be rewritten to $L_{U-estimated}=L_U+(K-1)\times L_B$. It may be desired to want $L_{U-estimated}$ to have an appropriate margin to $C_T$. Hence, a suitable condition is $L_{U-estimated}<t_1 \times C_T$, where $t_1$ provides the appropriate margin. Using the above expression for $L_{U-estimated}$ this may be rewritten as $L_U+(K-1)\times L_B<t_1\times C_T$, which may be rearranged to form the above proposed trigger condition, i.e. $L_U<t_1\times C_T-(K-1)\times L_B$.

$T_2$:

A switch of the mode of operation of B from RU-MU operation to regular operation is triggered when the following condition is met:

$$L_U>t_2\times C_T$$

The trigger condition for $T_2$ may be much simpler than for $T_1$, because for $T_2$ it may not be necessary to estimate what $L_U$ will be after a potential switch of operation mode. Thus, comparing $L_U$ with $C_T$, with an appropriate margin provided by $t_2$, suffices.

$t_1$ and $t_2$:

As mentioned above the margins to $C_T$ may be different for the two different switching conditions in order to form a hysteresis. Hence, the above presented trigger conditions imply that $t_2 \geq t_1$. An example of possible values could be $t_1=0.75$ and $t_2=0.90$.

A potential issue with the above description is that undesirable behavior may result if the scaling factor K is inappropriately dimensioned.

If K is too small, the result may be that when B is switched from regular operation to RU-MU operation, the resulting load on T, i.e. $L_U$, is greater than $t_2\times C_T$, i.e. the trigger condition for switching back from RU-MU operation to regular operation may be met. Hence, the inappropriate K value creates a too optimistic trigger condition for switching from regular operation to RU-MU operation, which in turn results in "ping-pong" switches between the operation modes.

If K on the other hand is too large, the consequences are not so severe. The consequence is merely that the trigger condition for switching from regular operation to RU-MU operation becomes unnecessary pessimistic, which in turn means that the possibilities for RU-MU operation may not be fully utilized. Even though this is a lesser problem than "ping-pong" switches between operation modes, it may be still undesirable and may preferably be avoided through appropriate dimensioning of K.

In one embodiment, a way to ensure that K is appropriately dimensioned is to make it self-tunable. To this end, the entity determining the operation mode switches, based on load measurements and the trigger conditions, monitor the changes in load on T, i.e. the changes in $L_U$, that result from the operation mode switches. Such monitoring may provide a sort of "calibration" which makes it possible to ensure that K is set to a value that reflects the real traffic load increase caused by switching from regular operation to RU-MU operation. The value of K may be refined over time as more and more monitoring results can be used in an average calculation. Such averaging may advantageously be a sliding average, e.g. an exponential average (e.g. $K_{n+1}=\alpha\times K_n+(1-\alpha)\times K^*$, where $K^*$ is the K value calculated from the latest (set of) monitoring, $\alpha$ is a number $0\leq \alpha \leq 1$, $K_n$ is the K value derived from the previous exponential average calculation and $K_{n+1}$ is the current value to be calculated for the exponential average of K).

Figure 6:
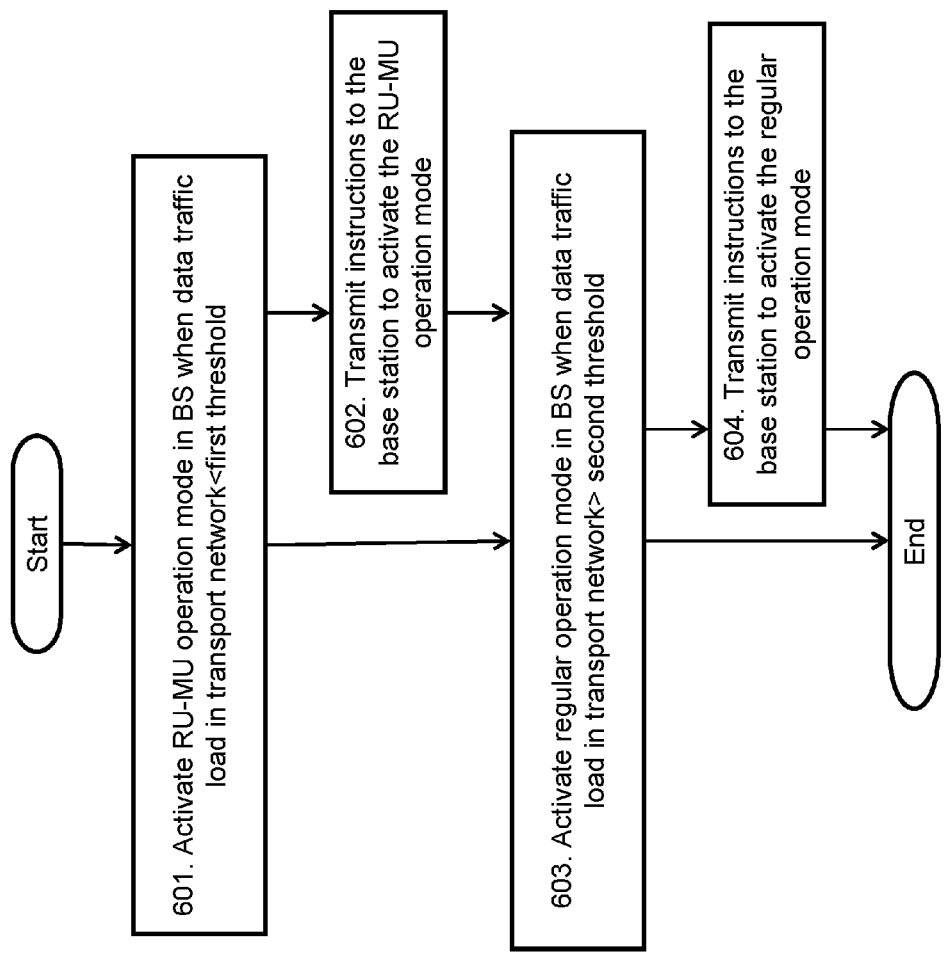
FIG. 6 is a flow chart illustrating embodiments of a method in a first network node.

The method described above will now be described seen from the perspective of the first network node 103. FIG. 6 is a flowchart describing the present method in the first network node 103, for handling operation mode of the base station 101. The communications network 100 comprises a transport network. The first network node 103 is represented by the base station 101, by an O&M, node, a MU, a NOC or a second network node. The method comprises the further steps to be performed by the first network node 103, which steps may be performed in any suitable order:

Step 601

Figure 2:
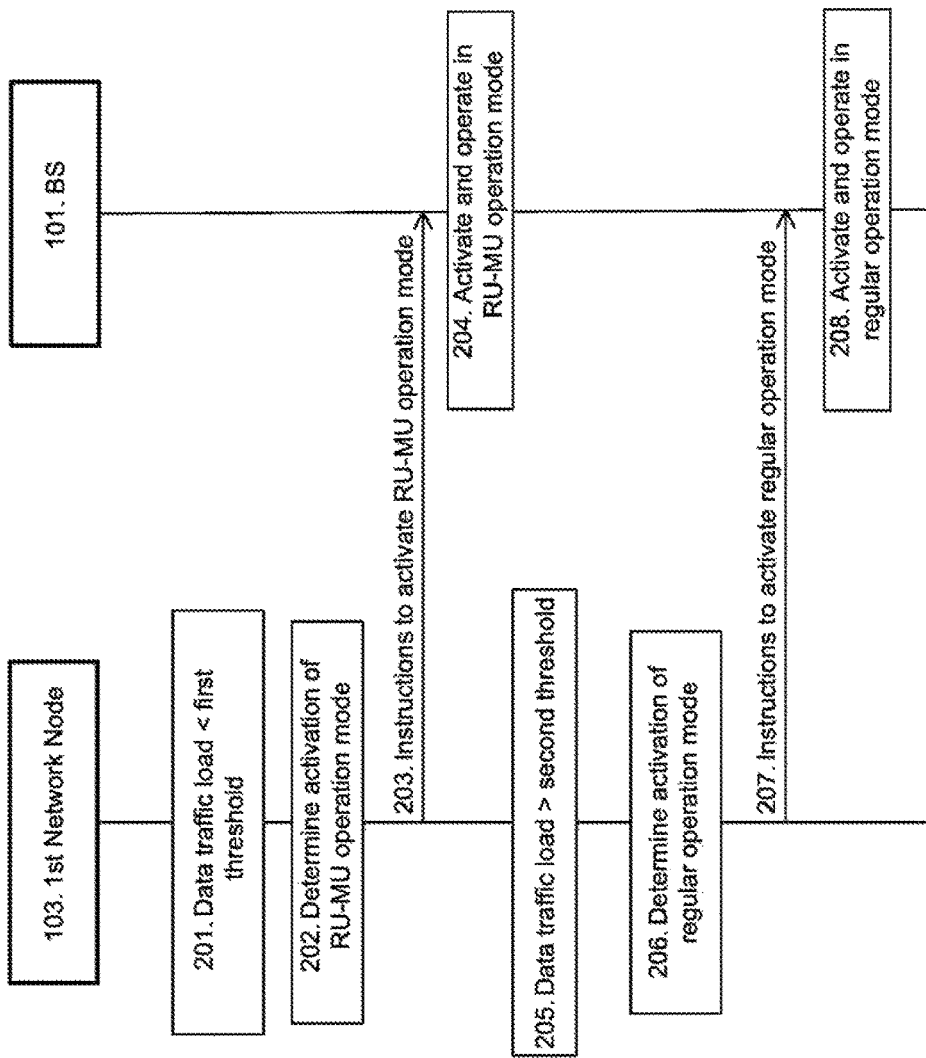
FIG. 2 is a signaling diagram illustrating embodiments of a method.

This step corresponds to steps 201, 202, 203 and 204 in FIG. 2.

The first network node 103 activates the RU-MU operation mode in the base station 101 when data traffic load in the transport network is below a first threshold.

In some embodiments, the RU MU operation mode is activated when data traffic load in the transport network is below the first threshold and when a transport network transmission capacity of the base station 101 for the RU-MU operation mode is above a third threshold.

The data traffic load may be associated with the bit rate in the transport network.

In some embodiments, the RU-MU operation mode is represented by a RU functionality in the base station 101 and a MU functionality in a centrally located unit.

In some embodiment, the RU-MU operation mode is activated when $L_U<t_1\times C_T-(K-1)\times L_B$. As mentioned above, $L_U$ is a load on T pertaining to a set of other base stations sharing a bottleneck resource of the transport network with the base station 101 and the base station 101 together, T is an entity whose data traffic load is to be considered, $T_1$ is the first threshold, $C_T$ is a full capacity of T, K is a scaling factor representing an increase of a load pertaining to the base station 101 when RU-MU operation mode is activated, and $L_B$ is a load on T pertaining to the base station 101.

Step 602

This step corresponds to step 203 in FIG. 2.

This step is performed after step 601. In some embodiments, the first network node 103 transmits instructions to the base station 101 to activate the RU-MU operation mode.

Step 603

This step corresponds to steps 205, 206, 207 and 208 in FIG. 2.

The first network node 103 activates a regular operation mode in the base station 101 when the data traffic load in the transport network is above a second threshold.

The first threshold may be equal to the second threshold, or the first threshold is different from the second threshold. The second threshold may be larger than the first threshold.

In some embodiments, the regular operation mode is activated when the data traffic load in the transport network is above the second threshold and when a transport network transmission capacity of the base station 101 for the RU-MU operation mode is below a fourth threshold.

The third threshold may be different from the fourth threshold. The fourth threshold may be smaller than the third threshold.

In some embodiments, the regular operation mode is represented by a RU functionality in the base station 101 and a MU functionality in the base station 101.

In some embodiment, the regular operation is activated when $L_U>t_2\times C_T$. As mentioned above, $L_U$ is a load on T pertaining to a set of other base stations sharing a bottleneck resource of the transport network with the base station 101 and the base station 101 together, T is an entity whose data traffic load is to be considered, $t_2$ is the second threshold, and $C_T$ is a full capacity of T.

Step 604

This step corresponds to step 207 in FIG. 2.

This step is performed after step 603. In some embodiments, the first network node 103 transmits instructions to the base station 103 to activate a regular operation mode.

Figure 7:
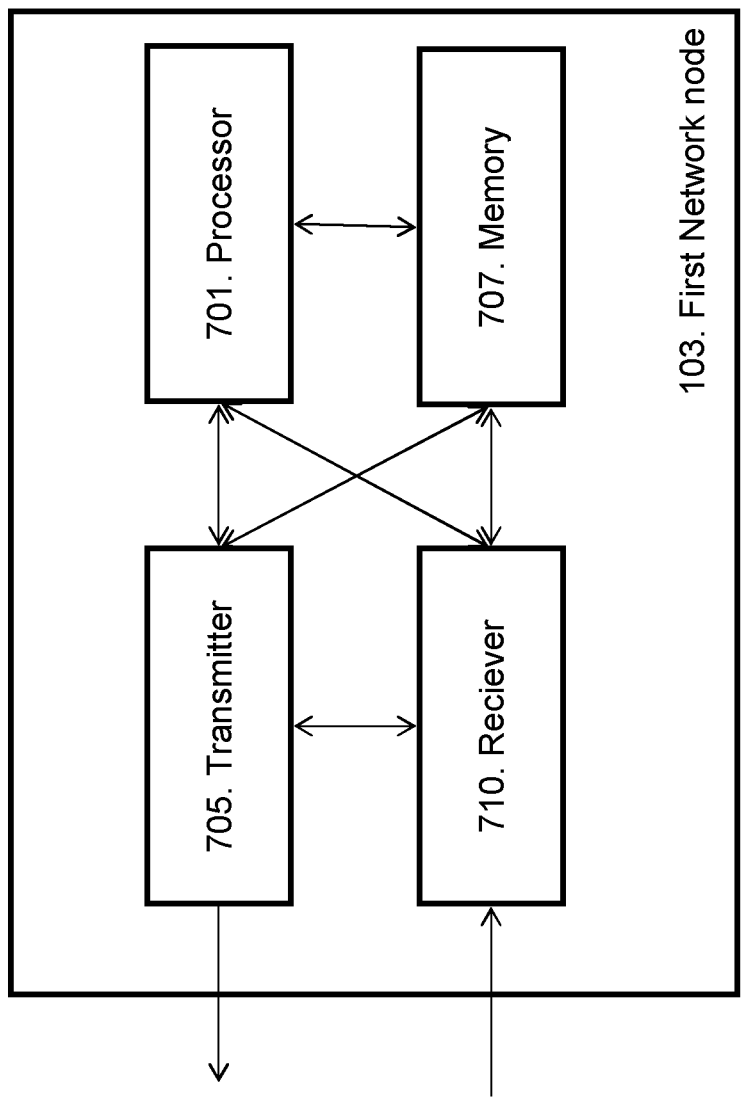
FIG. 7 is a schematic block diagram illustrating embodiments of a first network node.

To perform the method steps shown in FIG. 6 for handling operation mode of the base station 101 in a communications network 100, the first network node 103 comprises an arrangement as shown in FIG. 7. The communications network 100 comprises a transport network. The first network node 103 may be represented by the base station 101 and/or the O&M node and/or the MU and/or the NOC and/or a second network node.

The first network node 103 comprises a processor 701 configured to activate a RU-MU operation mode in the base station 101 when data traffic load in the transport network is below a first threshold. In some embodiments, the RU MU operation mode is activated when data traffic load in the transport network is below the first threshold and when a transport network transmission capacity of the base station 101 for the RU-MU operation mode is above a third threshold. In some embodiments, the data traffic load is associated with the bit rate in the transport network. The RU-MU operation mode may be represented by a RU functionality in the base station 101 and a MU functionality in a centrally located unit.

The processor 701 is further configured to activate a regular operation mode in the base station 101 when the data traffic load in the transport network is above a second threshold. In some embodiments, the regular operation mode is activated when the data traffic load in the transport network is above the second threshold and when a transport network transmission capacity of the base station 101 for the RU-MU operation mode is below a fourth threshold. The regular operation mode may be represented by a RU functionality in the base station 101 and a MU functionality in the base station 101.

In some embodiments, the first threshold is equal to the second threshold, or the first threshold is different from the second threshold. The second threshold may be larger than the first threshold. The third threshold may be different from the fourth threshold. The fourth threshold may be smaller than the third threshold.

In some embodiments, the first network node 103 further comprises a transmitter 705 which is configured to transmit instructions to the base station 101 to activate the RU-MU operation mode, and/or to transmit instructions to the base station 101 to activate a regular operation mode.

The present mechanism for handling operation mode of the base station 101 may be implemented through one or more processors, such as the processor 701 in the first network node arrangement depicted in FIG. 7, together with computer program code for performing the functions of the embodiments herein. The processor may be for example a Digital Signal Processor (DSP), Application Specific Integrated Circuit (ASIC) processor, Field Programmable Gate Array (FPGA) processor or microprocessor. The program code mentioned above may also be provided as a computer program product, for instance in the form of a data carrier carrying computer program code for performing the embodiments herein when being loaded into the first network node 103. One such carrier may be in the form of a CD ROM disc. It is however feasible with other data carriers such as a memory stick. The computer program code may furthermore be provided as pure program code on a server and downloaded to the first network node 103.

The first network node 103 may further comprise a memory 707 comprising one or more memory units. The memory 707 is arranged to be used to store data, received data streams, power level measurements, data traffic load, instructions to the base station 101, first threshold, second threshold, third threshold, fourth threshold, bit rate, time periods, configurations, schedulings, and applications to perform the methods herein when being executed in the first network node 103.

The first network node 103 may comprise a receiver 710 configured to receive signals from the base station 10 and other nodes in the communications network 100.

Those skilled in the art will also appreciate that the receiver 710 and the transmitter 705 described above may refer to a combination of analog and digital circuits, and/or one or more processors configured with software and/or firmware, e.g. stored in the memory 707, that when executed by the one or more processors such as the processor 701 perform as described above. One or more of these processors, as well as the other digital hardware, may be included in a single ASIC, or several processors and various digital hardware may be distributed among several separate components, whether individually packaged or assembled into a System-on-a-Chip (SoC).

The embodiments herein are not limited to the above described embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasized that the steps of the methods defined in the appended claims may, without departing from the embodiments herein, be performed in another order than the order in which they appear in the claims.

The invention claimed is:

1. A method in a first network node for handling operation mode of a base station in a communications network, which communications network comprises a transport network, the method comprising:

activating a Remote Unit-Main Unit, RU-MU, operation mode in the base station when data traffic load in the transport network is below a first threshold; and activating a regular operation mode in the base station when the data traffic load in the transport network is above a second threshold, wherein the RU-MU operation mode is activated when $L_U < t_1 \times C_T - (K-1) \times L_B$, wherein $L_U$ is a load on T pertaining to a set of other base stations sharing a bottleneck resource of the transport network with the base station and the base station together, T is an entity whose data traffic load is to be considered, $t_1$ is the first threshold, $C_T$ is a full capacity of T, K is a scaling factor representing an increase of a load pertaining to the base station when the RU-MU operation mode is activated, and $L_B$ is a load on T pertaining to the base station.

2. The method according to claim 1, further comprising transmitting instructions to the base station to activate the RU-MU operation mode.

3. The method according to claim 1, wherein the first threshold is equal to the second threshold.

4. The method according to claim 1, wherein the second threshold is larger than the first threshold.

5. The method according to claim 1, wherein the RU-MU operation mode is activated when the data traffic load in the transport network is below the first threshold and when a transport network transmission capacity of the base station for the RU-MU operation mode is above a third threshold; and wherein
the regular operation mode is activated when the data traffic load in the transport network is above the second threshold and when the transport network transmission capacity of the base station for the RU-MU operation mode is below a fourth threshold.

6. The method according to claim 5, wherein the third threshold is different from the fourth threshold.

7. The method according to claim 5, wherein the fourth threshold is smaller than the third threshold.

8. The method according to claim 1, wherein the data traffic load is associated with a bit rate in the transport network.

9. The method according to claim 1, wherein the first network node is represented by at least one of the base station, an Operation and Maintenance, O&M, node, a Main Unit, MU, a Network Operation Center, NOC, and a second network node.

10. The method according to claim 1, wherein the RU-MU operation mode is represented by a RU functionality in the base station and a MU functionality in a centrally located unit.

11. The method according to claim 1, wherein the regular operation mode is represented by a RU functionality in the base station and a MU functionality in the base station.

12. The method according to claim 1, wherein the regular operation mode is activated when $L_U > t_2 \times C_T$;
wherein $t_2$ is the second threshold.

13. A first network node for handling operation mode of a base station in a communications network, which communications network comprises a transport network, the first network node comprising:
a processor configured to:
activate a Remote Unit-Main Unit, RU-MU, operation mode in the base station when data traffic load in the transport network is below a first threshold; and
activate a regular operation mode in the base station when the data traffic load in the transport network is above a second threshold,
wherein the RU-MU operation mode is activated when $L_U < t_1 \times C_T - (K-1) \times L_B$, wherein $L_U$ is a load on T pertaining to a set of other base stations sharing a bottleneck resource of the transport network with the base station and the base station together, T is an entity whose data traffic load is to be considered, $t_1$ is the first threshold, $C_T$ is a full capacity of T, K is a scaling factor representing an increase of a load pertaining to the base station when the RU-MU operation mode is activated, and $L_B$ is a load on T pertaining to the base station.

14. The first network node according to claim 13, further comprising a transmitter configured to transmit instructions to the base station to activate the RU-MU operation mode.

15. The first network node according to claim 13, wherein the first threshold is equal to the second threshold.

16. The first network node according to claim 13, wherein the second threshold is larger than the first threshold.

17. The first network node according to claim 13, wherein the RU-MU operation mode is activated when the data traffic load in the transport network is below the first threshold and when a transport network transmission capacity of the base station for the RU-MU operation mode is above a third threshold; and wherein
the regular operation mode is activated when the data traffic load in the transport network is above the second threshold and when the transport network transmission capacity of the base station for the RU-MU operation mode is below a fourth threshold.

18. The first network node according to claim 17, wherein the third threshold is different from the fourth threshold.

19. The first network node according to claim 17, wherein the fourth threshold is smaller than the third threshold.

20. The first network node according to claim 13, wherein the data traffic load is associated with a bit rate in the transport network.

21. The first network node according to claim 13, wherein the first network node is represented by at least one of the base Station, an Operation and Maintenance, O&M, node, a Main Unit, MU, a Network Operation Center, NOC, and a second network node.

22. The first network node according claim 13, wherein the RU-MU operation mode is represented by a RU functionality in the base station and a MU functionality in a centrally located unit.

23. The first network node according to claim 13, wherein the regular operation mode is represented by a RU functionality in the base station and a MU functionality in the base station.

24. The first network node according to claim 13, wherein the regular operation is activated when $L_U > t_2 \times C_T$;
wherein $t_2$ is the second threshold.

25. The method according to claim 1, further comprising transmitting instructions to the base station to activate the regular operation mode.

26. The method according to claim 1, wherein the first threshold is different from the second threshold.

27. The first network node according to claim 13, further comprising a transmitter configured to transmit instructions to the base station to activate the regular operation mode.

28. The first network node according to claim 13, wherein the first threshold is different from the second threshold.

* * * * *